UNITED STATES PATENT OFFICE.

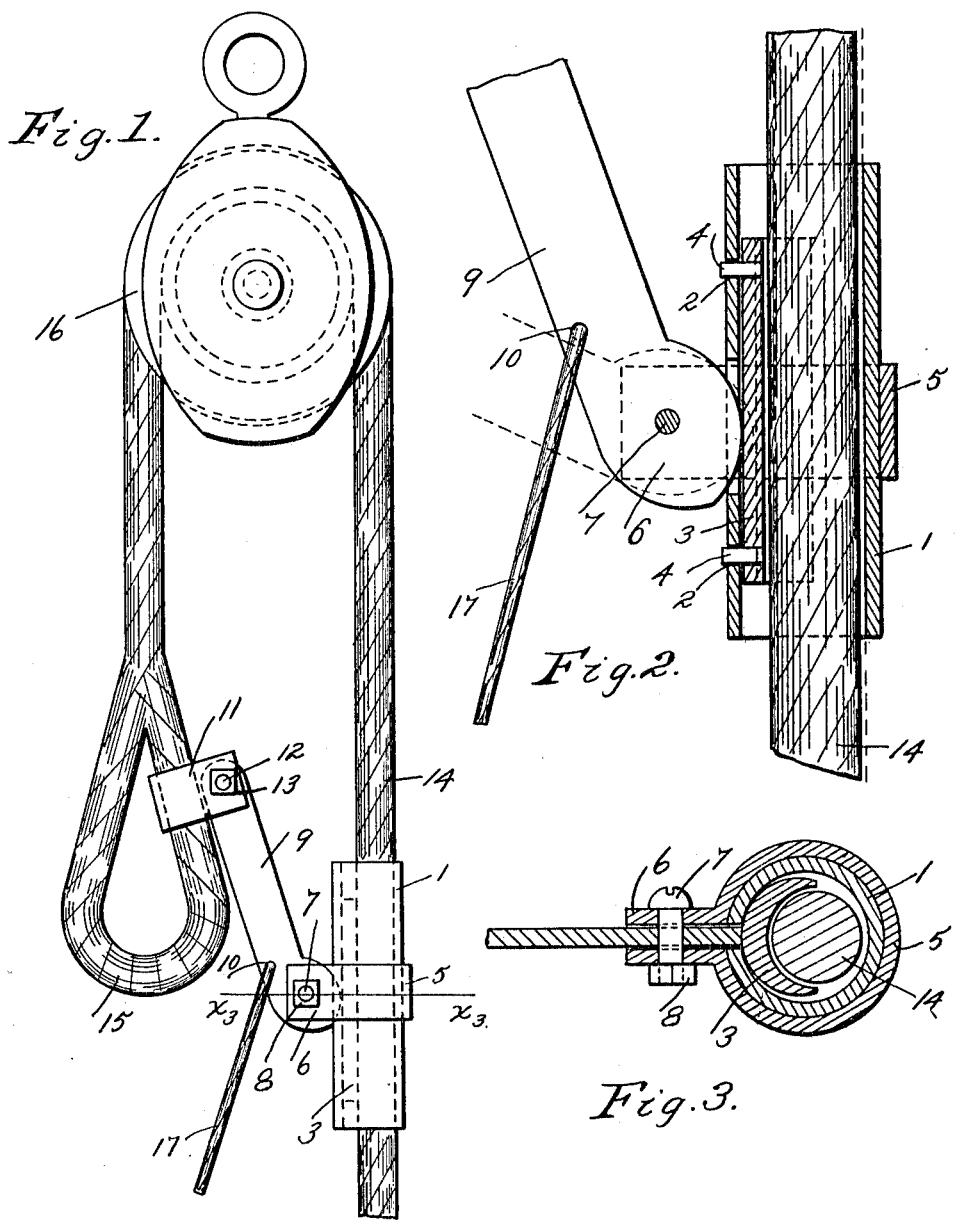

ROY DAVIS, OF LONG BEACH, CALIFORNIA.

ROPE-CLUTCH FOR HOISTS.

1,105,624.

Specification of Letters Patent.

Patented Aug. 4, 1914.

Application filed March 7, 1913. Serial No. 753,882.

*To all whom it may concern:*

Be it known that I, ROY DAVIS, a citizen of the United States, residing at Long Beach, in the county of Los Angeles and State of California, have invented a new and useful Rope-Clutch for Hoists, of which the following is a specification.

My invention relates to improvements in rope clutch for hoists, and the object of my invention is to provide a simple and effective device for clutching and holding a hoist at any stage and simple means to release the same. I attain this object by means of the mechanism illustrated in the accompanying drawings, in which—

Figure 1 is a perspective view of my clutch attached to a hoist. Fig. 2 is a vertical sectional view of a part of the clutch showing it in a loose, and in a gripping position. Fig. 3 is a cross sectional view of the clutch on the line $X^3$—$X^3$ Fig. 1.

My clutch is composed of the sleeve 1 around which is the collar 5 with the lugs 6 perforated to receive the bolt 7. Inside the sleeve 1 is the semicylindrical plate 3 provided with the pins 4 which set loosely in the holes 2 in the sleeve 1. The arm 9 has its lower end formed into a cam 9' which is pivotally mounted between the lugs 6 of the collar 5 by means of the bolt 7 and the nut 8, and to its upper end is pivotally secured the collar 11 by means of the bolt 12 and the nut 13. The hand end of the rope 14 is run through the collar 1 and over the pulley 16 to the hoist end which is run through the collar 11 and provided with the loop 15.

The arm 9 is upwardly inclined and in the lower end is the hole 10 in which is secured the hand line 17. When the rope 14 is pulled downward, it slides loosely through the sleeve 1 as the loop 15 rises and takes the clutch up with it, the friction of the cam 9' being released, but if at any point, the rope 14 is allowed to slack, the weight on the hoist loop 15 will pull the upper end of the arm 9 down and cause the cam 9' to press against the plate 3 and the latter against the rope 14, thus stopping the motion of the rope. When the weight has been hoisted and removed, the loop 15 and the sleeve 1 may be caused to descend by pulling the hand line 17, the latter being secured to the arm 9 at a point close to its pivotal point, so that in pulling on the hand line, not enough pressure can be exerted on the cam as to cause it to lock the rope in the clutch. I may also place this hand line and secure it at any convenient point on the arm or the sleeve.

What I claim as my invention and desire Letters Patent for, is;—

1. A rope clutch comprising a sleeve, a semi-cylindrical plate loosely mounted in said sleeve, a collar on said sleeve having lugs on one side thereof, an inclined arm pivoted at its lower end between and to said lugs, said lower end having a cam shaped portion adapted to extend through an opening in said sleeve and to engage said plate, a collar pivoted to the upper end of said arm and adapted to be connected with the hoisting end of a rope, and a hand line secured to and near the pivotal point of said arm, in combination, as and for the purpose specified.

2. A rope clutch having an elongated vertical sleeve adapted to slide on a hoisting rope, a semi-cylindrical plate loosely mounted within and at one side of said sleeve adapted to frictionally engage said rope and lock said sleeve against movement thereon, a collar around and secured to said sleeve near its center having lugs projecting outwardly therefrom, an arm normally inclined from and pivoted between and to said lugs at its lower end, said lower end having a cam shaped portion adapted to extend through an opening in said sleeve and engage said plate for increasing or diminishing the friction between said plate and said rope, a collar pivoted to the upper end of said arm adapted to be connected with the hoisting end of a rope, and a hand line secured to said arm near its pivotal point for regulating the position of the sleeve on the rope, as described.

ROY DAVIS.

Witnesses:
J. E. BOOKSTÄVER,
M. E. KINNEY.

Copies of this patent may be obtained for five cents each, by addressing the "Commissioner of Patents, Washington, D. C."